United States Patent [19]

Albanese et al.

[11] 4,450,448

[45] May 22, 1984

[54] APPARATUS AND METHOD FOR IMPROVING ANTENNA SIDELOBE CANCELLATION

[75] Inventors: Victor J. Albanese, Valley Stream; Charles J. Schmidt, Islip, both of N.Y.

[73] Assignee: Grumman Aerospace Corporation, New York, N.Y.

[21] Appl. No.: 297,181

[22] Filed: Aug. 28, 1981

[51] Int. Cl.$^3$ ............................. G01S 3/16; G01S 3/28
[52] U.S. Cl. ...................................... 343/379; 343/372
[58] Field of Search .................. 343/100 SA, 100 LE, 343/854, 379, 372

[56] References Cited

U.S. PATENT DOCUMENTS

| | | | |
|---|---|---|---|
| 3,435,453 | 3/1969 | Howard | 343/100 |
| 3,824,500 | 7/1974 | Rothenberg | 343/100 SA |
| 3,916,417 | 10/1975 | Wong et al. | 343/854 |
| 3,981,014 | 9/1976 | Masak | 343/100 LE |
| 3,982,245 | 9/1976 | Soule, Jr. et al. | 343/100 LE |
| 3,987,444 | 10/1976 | Masak et al. | 343/100 LE |
| 4,005,426 | 1/1977 | White | 343/100 LE |
| 4,079,379 | 3/1978 | Piesinger | 343/100 SA |
| 4,079,380 | 3/1978 | Esry et al. | 343/100 SA |
| 4,079,381 | 3/1978 | Piesinger | 343/100 SA |
| 4,086,592 | 4/1978 | Lewis et al. | 343/100 LE |
| 4,100,544 | 7/1978 | Keeran | 343/6.5 R |

*Primary Examiner*—Theodore M. Blum
*Attorney, Agent, or Firm*—Morgan, Finnegan, Pine, Foley & Lee

[57] ABSTRACT

An apparatus and method for use in an n-element electronically scannable array antenna provides a notched auxiliary radiation pattern for use in reducing interference energy received in the sidelobes of the antenna's main radiation pattern. The apparatus includes circuitry for feeding the antenna elements in series from one end of the array to the opposed end thereof. Each antenna element is fed through a directional coupler which is responsive to its associated antenna element along with the downstream antenna elements in the array. The directional couplers provide a first output signal for forming a primary radiation pattern. At least one directional coupler also provides a second output signal on receive for forming an auxiliary radiation pattern having a notch in the direction of the primary radiation pattern main beam and electronically steerable therewith, and a relatively uniform response in all other directions. The first and second outputs may be fed to a combining circuit for cancelling or blanking the signal appearing in the sidelobes of the primary radiation pattern.

9 Claims, 3 Drawing Figures

APPARATUS AND METHOD FOR IMPROVING ANTENNA SIDELOBE CANCELLATION

BACKGROUND OF THE INVENTION

1. Field of the Invention

This invention relates to an antenna array, and more particularly, to a method and apparatus for providing an auxiliary array antenna pattern that may be used to suppress interference in the received signal.

2. The Prior Art

A typical radar system employs a highly directional antenna which has a narrow main beam and many sidelobes. As is known, a signal within the received frequency band of the radar may cause radar jamming by having sufficient amplitude to saturate the radar receiver when that signal is incident on the antenna sidelobes as well as the main beam. Thus, the presence of sidelobes makes it possible for a single jammer to be effective against the radar from any angle of azimuth. In order to counter this prossible jamming, prior art systems have been developed which effect the cancelling or blanking of the interfering signal. These systems generally employ omni-directional auxiliary antennas having a substantially uniform gain as inputs to a cancellation system. The antennas are combined in a manner that will cancel the energy received in the main antenna sidelobes at discrete angular directions, thus reducing the interference energy received in the sidelobes and minimizing the deleterious effects of hostile jammers.

While such prior art cancellation systems are generally adequate, their effectiveness is somewhat lessened in radars which employ Moving Target Indicator (MTI) techniques. Specifically, when clutter energy in the direction of the radar's principal antenna main beam is received in an auxiliary antenna, the amount of the sidelobe cancellation is reduced.

It has been discovered that such interference clutter can be minimized by putting a notch or null in the auxiliary antenna pattern in the direction of the principal antenna main beam. Ideally, each of these auxiliary antennas generates a radiation pattern that receives little energy in the angular direction of the main beam of the principal radar antenna, but receives a relatively strong energy level of uniform amplitude at all other angular directions.

In theory, the provision of such a notch in the auxiliary antenna pattern minimizes the otherwise reduced effectiveness of sidelobe cancellation systems in MTI radars when clutter energy in the direction of the main antenna beam enters an auxiliary antenna. In practice, however, such provision presents additional problems that heretofore made such a method unworkable in phase scanning systems.

For example, one known method for providing auxiliary notch antennas has been by adding additional elements and support structure. However, this method overcomplicates the system and makes it unusable where space is at a premium. Another known method, for use in antenna arrays, has been the use of some of the array elements as auxiliary antennas. Such a method has not been viable, however, because it has inevitably decreased the gain of the full antenna and increased the sidelobe levels. In the case of electronically steerable arrays, additional problems exist. For example, there is a need to steer the notch in the auxiliary antenna pattern in the same direction as the main beam of the full array. In addition, providing a notched auxiliary radiation pattern in such an array typically results in the formation of grating lobes which in turn create additional notches in the auxiliary radiation pattern thus violating the desired design of providing a notch or null solely in the direction of the principal antenna main beam and a substantially uniform gain in all other directions. Further, the combining circuitry required for providing a notch in such an array is very complicated and in many cases the desired amplitude of the "out-of-notch" levels cannot be met across spatial angles of interest.

Accordingly, it is an object of this invention to provide an apparatus and method for improving sidelobe cancellation using an array antenna by providing a notched auxiliary antenna radiation pattern that employs existing elements and support structure, and which does not decrease the gain of the full antenna nor increase sidelobe levels.

It is another object of this invention to provide an apparatus and method for use in a series fed electronically scannable radar array antenna having the above characteristics and which produces a scannable precision tracking notch of desired width and level without in any manner disturbing the main beam or sidelobes of the array.

It is a further object of this invention to provide an apparatus and method for use in a series fed electronically scannable radar array antenna having the above characteristics and which includes means for controlling the depth and slope of the notch as well as the power level in the generally flat, "out-of-notch region" of the auxiliary radiation pattern.

SUMMARY OF THE INVENTION

In accordance with the above recited objectives, the present invention provides an n-element electronically scannable antenna array comprising feed means for feeding the antenna elements in series, the feed means having an input end portion adjacent to the first antenna element and a load termination end portion adjacent to the $n^{th}$ antenna element. The array further includes phase shifters, preferably variable phase shifters, which are connected to each antenna element. Each antenna element is fed through a directional coupler, preferably a slotted cross-guide directional coupler, which is responsive to its associated antenna element and the portion of the feed disposed between said associated antenna element and the antenna elements adjacent thereto, closest to the load termination end portion of the feed. Each directional coupler provides a first output signal for forming a primary radiation pattern. On receive, the first output signals of the directional couplers are summed up along the series feed to provide a summation output of the main receiver. On transmit a portion of the signal received from the transmitter is provided to each antenna element through its associated directional coupler. At least one directional coupler also provides a second output signal on receive, for forming an auxiliary radiation pattern having a notch in the direction of the main beam of the primary radiation pattern and a relatively uniform response in all other directions. This second directional coupler output is defined by the difference between the signal flowing from its respective antenna element and the signal flowing in the portion of the array from the load termination end portion of the array to the particular antenna element. The subject array also includes sidelobe cancellation circuit means that is responsive to the first and second outputs of the directional coupler for cancelling or blanking the signal appearing in the sidelobes of the primary radiation pattern. The subject array further includes means for selectively connecting one of the directional coupler second outputs with the sidelobe cancellation means, and control means for controlling the depth and slope of the auxiliary antenna pattern notch as well as the power level of the generally flat, "out-of-notch" region of the auxiliary pattern. Typically, said control means may comprise means for adjusting the gain of the particular antenna element associated with the second directional coupler output.

DESCRIPTION OF THE PREFERRED EMBODIMENTS

Figure 1:
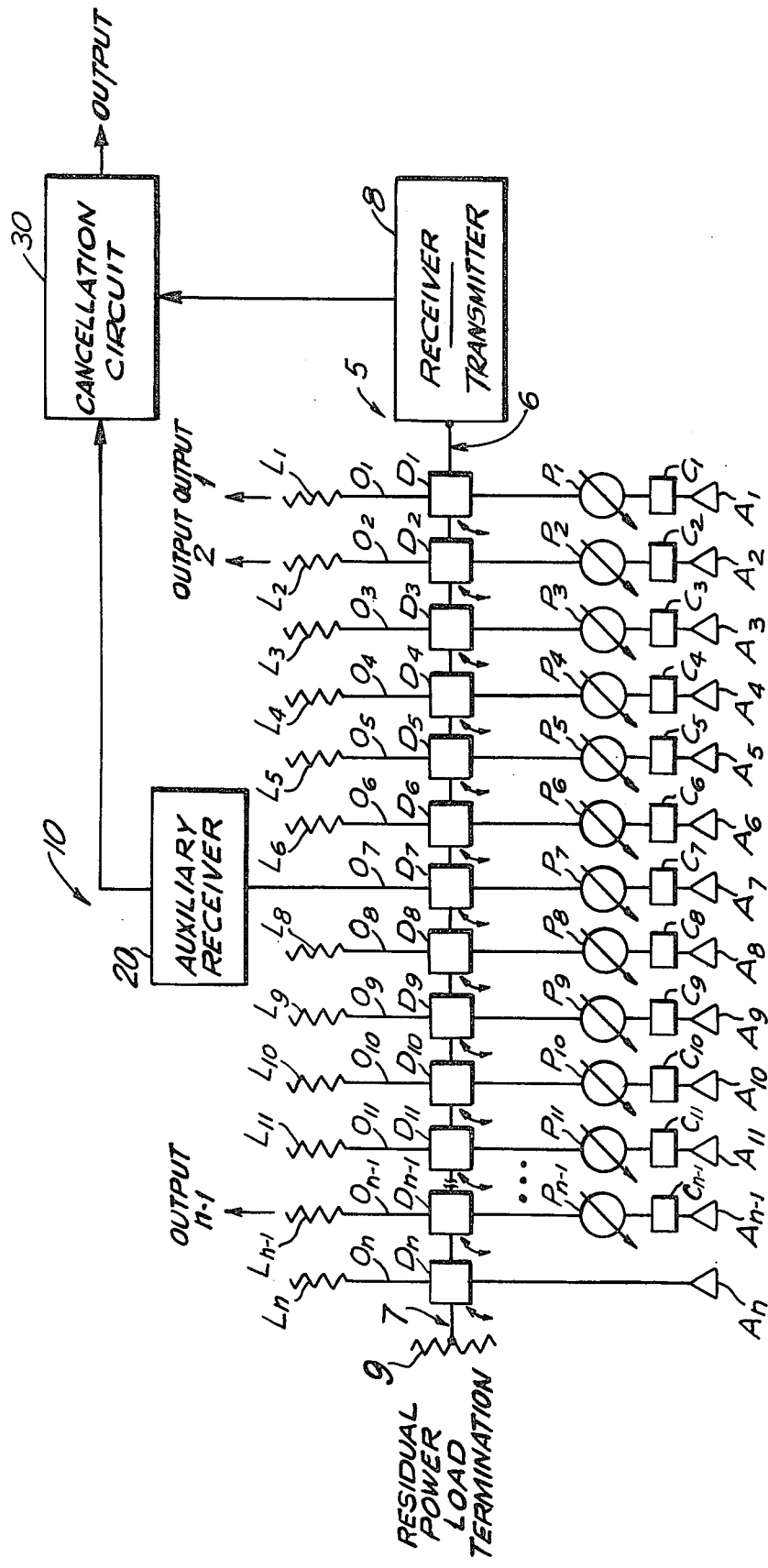
FIG. 1 is a schematic diagram of the electronically scannable antenna array of the present invention.

Referring to FIG. 1, a schematic diagram of the antenna array of the invention is illustrated. As shown, the array, which is designated generally by reference numeral 10, includes n separate antenna elements, $A_1-A_n$, which are fed in series by a series feed 5 having an input end portion 6 which is connected to a primary receiver-transmitter 8, and a residual power load termination end portion 7 which is connected to a dissipative load 9. Antenna elements $A_1-A_n$ may be dipoles, slots or other like radiation elements.

Each antenna element $A_1-A_n$ is fed through a directional coupler $D_1-D_n$ with the coupling values varying across series feed 5 depending upon the type of array illumination desired. As used herein, directional couplers are defined as four-port microwave junctions (for example, ports 1, 2, 3, 4 in directional coupler $D_1$) which comprise a pair of coupled waveguides with two or more spaced small apertures between them or a continuous aperture in the case of a 3-dB coupler. The power received into any one port is divided between two other ports, with the fourth port being isolated and usually terminated with a load. In the preferred embodiment, slotted cross-guide directional couplers are employed and the feed and couplers are structured such that the directional coupler disposed adjacent series feed input 6, i.e. directional coupler $D_1$, has the weakest coupling and the directional coupler adjacent residual power load termination end portion 7 of the series feed 5, i.e. the $n^{th}$ directional coupler $D_n$, has the strongest coupling.

In order to effect antenna beam scanning, variable phase shifters $P_1-P_{n-1}$ are included in the array, each phase shifter being connected to an antenna element. Preferably, phase shifters $P_1-P_{n-1}$ are digital. It will be understood that while variable phase shifters are shown in FIG. 1, fixed phase shifters could also be used along with a variable frequency to obtain the desired beam scanning.

In accordance with this invention, each directional coupler port directly opposite each antenna element $A_1-A_{n-1}$, i.e. the "4" ports shown in directional couplers $D_1-D_{n-1}$, defines a possible auxiliary antenna output $O_1-O_{n-1}$ for generating the desired onmi-directional auxiliary antenna pattern to be used for sidelobe cancellation. In typical known antenna arrays all of the directional coupler "4" ports, as well as any other unused coupler ports, would otherwise be connected to dissipative loads in order to absorb residual energy in the array. However, as shown in FIG. 1, this invention provides that at least one of the possible auxiliary outputs $O_1-O_{n-1}$ e.g. output $O_7$ in FIG. 1, is connected to an auxiliary receiver 20 with the remaining auxiliary outputs being terminated by a load $L_1-L_n$. It is contemplated that more than one auxiliary output may be employed, and in such a case an additional auxiliary receiver for each auxiliary output should be included. A cancellation circuit 30 is responsive to the output of auxiliary receiver 20 and that of the primary antenna receiver 8 for combining said outputs and effecting the desired sidelobe cancellation.

Still referring to FIG. 1, the preferred embodiment of the invention includes at least one control member $C_1-C_{n-1}$ each being connected to one of the antenna elements $A_1-A_{n-1}$ for changing the gain of its associated antenna member. As will be described in more detail below, control members $C_1-D_{n-1}$, along with other means to be discussed below, provide means for controlling the depth and slope of the notch in the auxiliary relation pattern as well as the amplitude of the flat or "out-of-notch" portions of the pattern.

Figure 2:
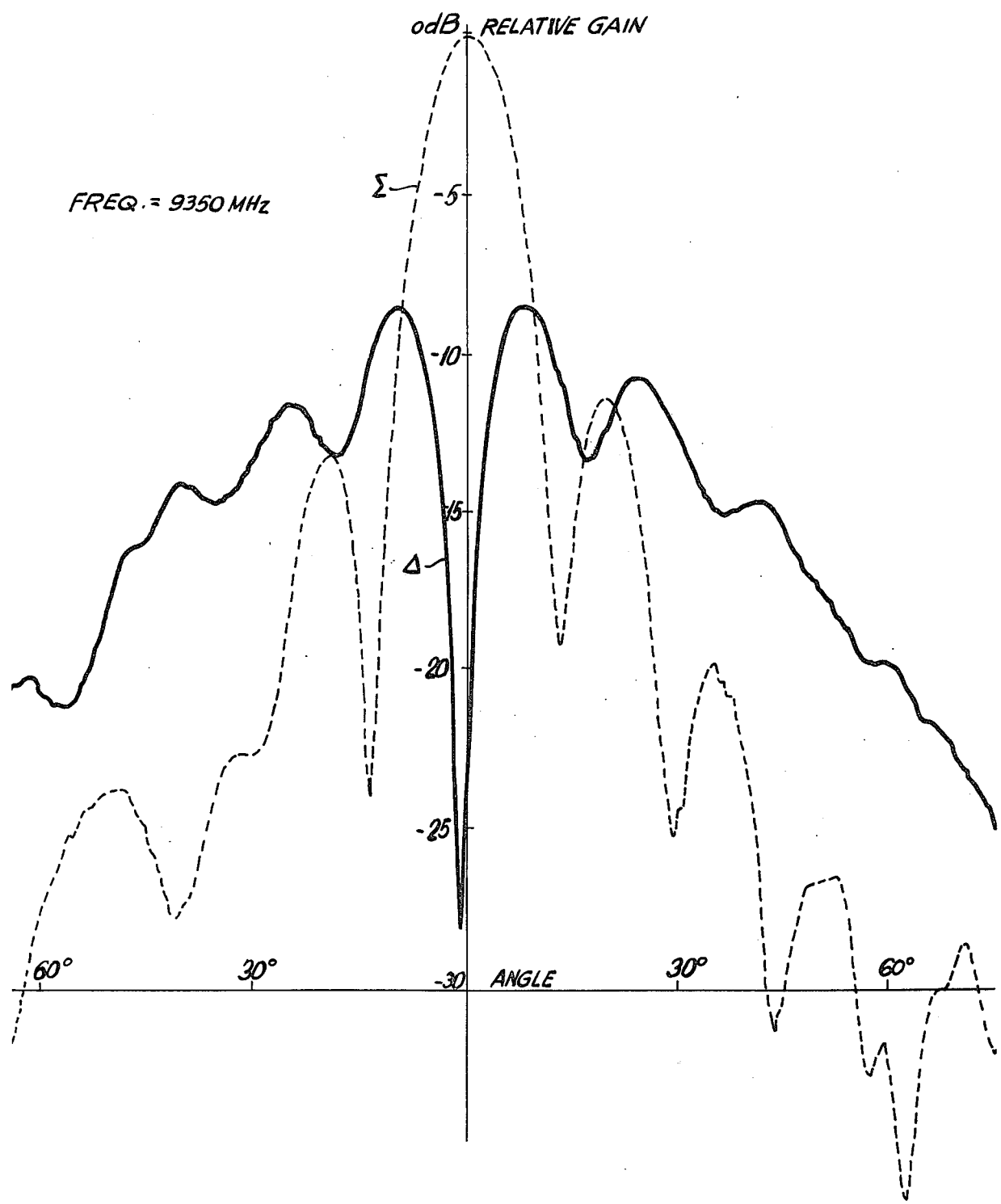
FIG. 2 is a graph depicting the notched auxiliary antenna radiation pattern provided by one of the directional coupler second outputs of the present invention.

By array theory and series feed analysis, equations can be evolved for the power in any one of auxiliary outputs $O_1-O_{n-1}$. Referring to FIG. 2 the characteristic of this output, which is illustrated in the solid line curve ($\Delta$), is a sharp notch pointing in the direction of the primary antenna's main radiation beam and a relatively uniform response in all other directions whose gain is approximately equal to the gain of a single antenna element. This gain can be considerably higher than the strongest sidelobe levels of a typically designed and constructed antenna array.

For illustration purposes, the "receive" operation of the apparatus, will be described below. More particularly, referring to FIG. 1, phase shifters $P_1-P_{n-1}$ are adjusted with a uniform phase gradient between adjacent elements so that the receive power at the directional couplers' ($D_1-D_{n-1}$) main junctions are all in phase regardless of direction of arrival into the main beam. That is to say, for any angle of arrival of the main beam, the phase shifters are set to bring about an in-phase condition at the directional couplers. The collimating power along series feed 5, as energy moves from left to right in FIG. 1, is a continuing summation of in-phase voltages to produce an increasingly directive pattern and stronger signal in the desired direction.

Figure 3:
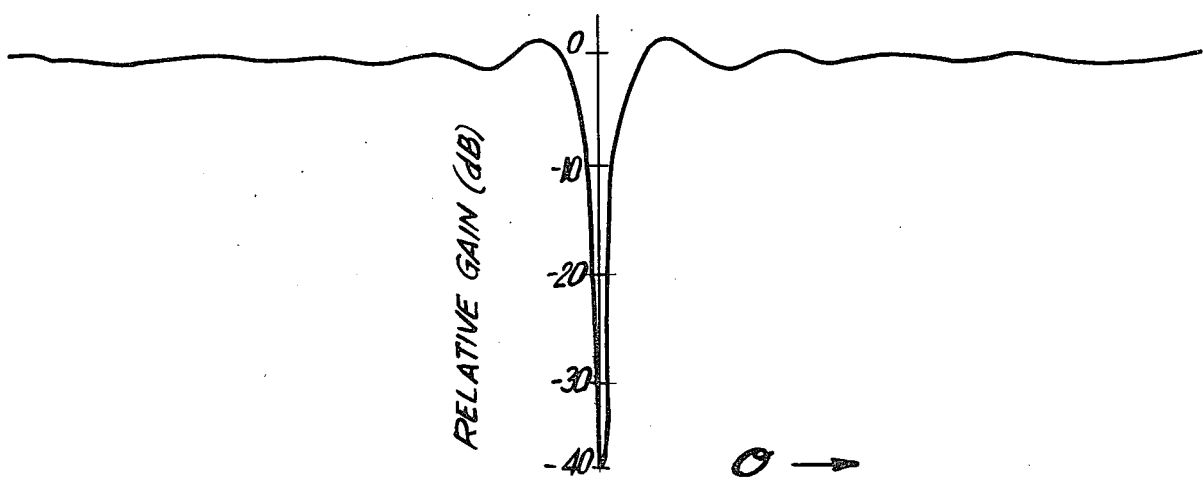
FIG. 3 is a graph depicting the calculated antenna radiation pattern of the present invention assuming the individual antenna elements are isotropic.

In accordance with this invention, any output $O_1-O_{n-1}$ is defined by the difference between the two signals flowing into its associated directional coupler; namely, a strongly coupled signal from the individual antenna element directly opposite the auxiliary output and a weakly coupled signal flowing down the series feed in the portion of the array from the load termination end portion of the feed 7 to said respective individual antenna element, i.e. to the left of the particular directional coupler as depicted in FIG. 1. Said differently, the total power at any chosen output $O_1-O_{n-1}$ is the vector difference between a large fraction of the voltage of the individual antenna element ($A_1-A_{n-1}$) opposite the respective auxiliary output and a small fraction of the main series feed summation voltage starting from the left (in FIG. 1) and up to that point in the array. Since the latter is representative of the directive antenna pattern up to that point, it is angularly sharp. This is exemplified by the dotted line curve ($\Sigma$) of measured data in FIG. 2. The form of the former voltage (not shown) is angularly broad and the difference of the two ($\Delta$ curve) produces a sharp notch in the direction of the principal antenna's main beam and a broad relative "flatness" outside this region. FIG. 3 is a curve of calculated data for the system of the present invention assuming that the individual antenna elements are isotropic.

The selected "notched" auxiliary antenna output ($O_1$-$O_{n-1}$) is fed to auxiliary receiver 20, the output of which being connected to cancellation circuit 30. The resultant or "summed" primary output of the antenna array is fed to primary receiver 8, the output of which also being connected to cancellation circuit 30. Cancellation circuit 30 combines the signal received from auxiliary receiver 20, i.e. that producing a pattern having a notch in the direction of the main beam of the principal antenna and a relatively flat out-of-notch level in all other angular directions, and the signal received from primary receiver 8, i.e. that producing a highly directive main beam and numerous sidelobes, and effects the desired cancellation in the sidelobes of the principal antenna.

The slope or sharpness of the notch and the depth thereof, along with the amplitude of the "out-of-notch" level of the auxiliary radiation pattern, vary with the particular auxiliary output ($O_1$-$O_{n-1}$) selected, the value of residual power in dissipative load 9, and the prescribed illumination of the antenna elements. Generally, the notch gets longer and sharper, and the "out-of-notch" level gets stronger as the selected auxiliary output is changed from $O_{n-1}$ toward $O_1$. Auxiliary output $O_n$ has a flat output throughout, i.e., no notch, and is generally not useful in the contemplated application. It has been found that as a practical matter, the notch of maximum length and the sharpness and the strongest "out-of-notch" level is typically achieved before reaching output $O_1$, with the length and sharpness of the notch and the strength of the "out-of-notch" level of the auxiliary pattern decreasing as one selects an auxiliary output beyond this maximum point (i.e. to the right in FIG. 1) and closer to output $O_1$.

Thus, by selecting the appropriate auxiliary output, designing the proper antenna illumination and the amount of energy channelled into dissipative load 9 by the proper design of antenna series feed 5, and appropriately adjusting the gain of the antenna element opposite the selected auxiliary output by means of its respective control member $C_1$-$C_{n-1}$, as discussed above, one may provide the auxiliary antenna pattern with a notch of desired length and sharpness and an "out-of-notch" level of desired amplitude.

In summary, this invention provides a method and apparatus for improving sidelobe cancellation in electronically scannable, series fed array antennas. The subject apparatus employs one of the existing antenna elements, i.e. one of the otherwise unused ports of its respective feed directional couplers as an auxiliary output. This is done at no cost to the principal antenna pattern because the apparatus only accepts energy from the main lobe "off-main lobe" angular directions of the pattern and requires no additional elements or support structure. Because the energy received by the auxiliary output is derived from direction discrimination rather than, for example, rejected energy generated as a result of illumination taper, the subject apparatus is applicable to antennas that provide uniform illumination as well as those providing tapered illumination. Further, because of the particular design of the subject apparatus, the notch generated in the auxiliary radiation pattern is automatically aligned with the main beam of the overall antenna pattern and it automatically and precisely tracks the main beam of the overall antenna as the principal antenna is scanned. In addition, the design of the subject apparatus enables one to generate an auxiliary radiation pattern having a notch of desired depth and sharpness and an "out-of-notch" level of desired amplitude further, because of the particular design of the subject apparatus the energy on both sides of the notch has the same phase polarity.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What is claimed is:

1. An electronically scannable array antenna comprising n individual antenna elements;

feed means for feeding said antenna elements in series, said feed means having an input end portion adjacent the first antenna element and a load termination end portion adjacent said $n^{th}$ antenna element;

phase shifter means connected to each antenna element; and a plurality of directional coupler means, each being responsive to one of said antenna elements and the portion of said feed means disposed between said one antenna element and the antenna element adjacent thereto, closest to said load termination end portion of said feed means and having a first port for providing a first output signal for forming a primary radiation pattern having a main beam and sidelobes, said first output signal being defined in the receive operation of the antenna by the sum of a portion of the signal flowing through its associated antenna element and the signal flowing in said feed means from said load termination end portion to said respective directional coupler, at least one of said directional coupler means having a second port for providing a second output signal which is defined in the receive operation of the antenna by the difference between a portion of the signal received from its associated antenna element and a portion of the signal flowing in said feed means from said load termination end portion to said respective directional coupler for forming an auxiliary radiation pattern having a notch in the direction of the main beam of said primary radiation pattern and a relatively flat output in all other directions.

2. An array antenna as in claim 1 wherein said phase shifter means are variable.

3. An array antenna as in claim 2 wherein said phase shifters are digital.

4. An array antenna as in claim 1 wherein said antenna elements are dipoles.

5. An array antenna as in claim 1 wherein said antenna elements are slot arrays.

6. An array antenna as in claim 1 which further comprises adjustment means associated with the antenna element associated with said directional coupler second port for adjusting the depth and sharpness of said notch and the amplitude of said out-of-notch output in said auxiliary radiation pattern.

7. An array antenna as in claim 6 wherein said adjustment means comprises means for adjusting the gain of the respective antenna element associated with said directional coupler second port.

8. An array antenna as in claim 1 which further comprises means connected to the load termination end portion of said feed means for absorbing any residual power in said antenna.

9. An electronically scannable array antenna comprising
- n individual antenna elements;
- feed means for feeding said antenna elements in series, said feed means having an input end portion adjacent the first antenna element and a load termination end portion adjacent said $n^{th}$ antenna element;
- variable phase shifter means connected to each antenna element; and
- a plurality of directional coupler means, each being responsive to one of said antenna elements and the portion of said feed means disposed between said one antenna element and the antenna element adjacent thereto, closest to said load termination end portion of said feed means and having a first port for providing a first output signal for forming a primary radiation pattern having a main beam and a sidelobe, said first output signal being defined in the receive operation of the antenna by the sum of a portion of the signal flowing through its associated antenna element and the signal flowing in said feed means from said load termination end portion to said respective directional coupler, at least one of said directional coupler means having a second port for providing a second output signal which is defined in the receive operation of the antenna by the difference between a portion of the signal received from its associated antenna element and a portion of the signal flowing in said feed means from said load termination end portion to said respective directional coupler for forming an auxiliary radiation pattern having a notch in the direction of the main beam of said primary radiation pattern and a relatively flat output in all other directions;
- adjustment means associated with the antenna element associated with said directional coupler second port for adjusting the depth and sharpness of said notch and the amplitude of said out-of-notch output in said auxiliary radiation pattern; and
- means connected to the load termination end portion of said feed means for absorbing any residual power in said antenna.

* * * * *